3,032,391
PRODUCTION OF CALCIUM BORATES
Geoffrey Robert Ball, Belvedere, and Godfrey Harold Bowden, Epsom, England, assignors to United States Borax & Chemical Corporation, Los Angeles, Calif., a corporation of Nevada
No Drawing. Filed July 28, 1959, Ser. No. 829,956
Claims priority, application Great Britain Aug. 20, 1958
2 Claims. (Cl. 23—59)

This invention relates to the production of crystalline calcium borates, and more particularly to the production of crystalline calcium 1,1-borate tetrahydrate and hexahydrate.

There is a large potential demand for pure calcium borate hydrates by the glass industry, and also they are of great interest to the ceramic industry and in steel manufacture, as an alternative to the use of lime and boric acid. Calcium 1,1-borate (otherwise known as calcium metaborate) has a higher melting point (about 1,154° C.) than boric acid and sodium borates (the usual suppliers of $B_2O_3$ in glass), and gives a more uniform melt when fused with other higher melting point ingredients.

It is known that crystalline calcium 1,1-borate hexahydrate may be made by several methods, e.g. by the reaction in aqueous solution of borax with calcium oxide or hydroxide in the presence of sodium hydroxide. It is also known that calcium 1,1-borate tetrahydrate may be made by the reaction of borax and caustic soda in aqueous solution with calcium hydroxide.

Although by using various combinations of sodium borates and calcium salts pure calcium metaborate can be produced, the processes are often of low efficiency in that comparatively little of the borate ion in the reactants is converted to calcium metaborate, and much of it may remain as a sodium borate of slightly different $Na_2O/B_2O_3$ ratio from the starting materials. Consequently a cyclic process in which the resultant sodium borate may be reconverted to the initial ratio is required for economic operation.

The reaction of borax, sodium hydroxide and calcium hydroxide may be represented by the following equation (omitting water of hydration):

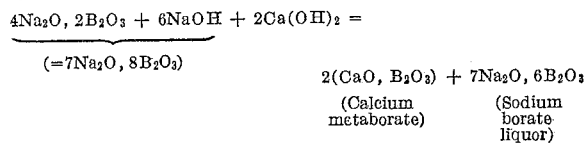

If the sodium borate liquor is to be recycled, a sodium borate having a molar ratio $Na_2O/B_2O_3$ below 1.0 may be added. This is done conveniently and economically by the addition of borax:

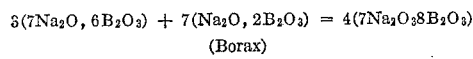

If the borax is added as a solid it is clear that the concentration of solids in the liquor will be increased, and as there is a maximum permissible concentration, dilution of the liquor is necessary. The volume of the liquor in hand is therefore increased, and as it continues to increase with each successive cycle a manufacturing process is not practicable.

The basic reason for impracticability of a cyclic process involving reaction between sodium borate and calcium hydroxide is the rapid build-up of the sodium content of the solution. We have found that this may be avoided by adding an anion which combines with the sodium ions to give a sodium salt which can be removed by fractional crystallisation. The anion is conveniently introduced as a calcium salt. Some or all of the calcium hydroxide may thus be replaced by the calcium salt of an organic or inorganic acid.

According to the present invention, crystalline calcium metaborate ($CaB_2O_4$) in the form of its tetrahydrate or hexahydrate is produced by reacting together borax, an alkali-metal hydroxide (e.g. sodium hydroxide), calcium hydroxide or calcium oxide, and a calcium salt (e.g. calcium sulphate or calcium chloride) or mixture of calcium salts, in an aqueous medium, and removing the crystals of hydrated calcium metaborate so obtained. The word "borax" is used in this specification to denote any sodium 1:2-borate, irrespectively of the number of molecules of water of crystallisation (if any).

Reaction is suitably effected at a temperature of 0° C. to 100° C., and preferably at a temperature of 25° C. to 100° C. The pH value of the aqueous medium is preferably 11 or higher.

Sodium hydroxide is the alkali-metal hydroxide normally used, but it may, as already implied, be replaced wholly or in part by other alkali-metal hydroxides as a source of hydroxyl ions.

The reaction mixture may be seeded with calcium metaborate tetrahydrate or hexahydrate according to whether the desired product is the tetrahydrate or the hexahydrate. The production of the tetrahydrate is favoured by higher temperatures within the ranges specified above, and when the tetrahydrate is in fact desired it is preferable to use a temperature above 40° C.

The method of the invention may be operated as a batch process or as a cyclic process. In a cyclic process the procedure may suitably comprise initially forming alkali-metal metaborate from borax and alkali-metal hydroxide, and then alternately (1) adding calcium hydroxide or oxide, the calcium salt(s), and borax to the system, and (2) removing crystalline hydrated calcium metaborate and one or more alkali-metal salt(s) corresponding with the calcium salt(s) used, for example in accordance with the equations:

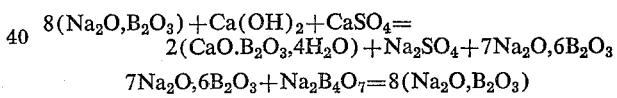

$$7Na_2O,6B_2O_3 + Na_2B_4O_7 = 8(Na_2O,B_2O_3)$$

In a cyclic process in accordance with the invention it is preferred that the molar proportions of calcium hydroxide or oxide to the calcium salt(s) should be substantially 1:1, e.g. 0.95:1 to 1.05:1.

The various materials used may be added in any order, and they may be used in various physical forms. Thus a solution of borax and alkali-metal hydroxide may for example be added to a slurry of calcium hydroxide or oxide and the calcium salt(s), or instead finely-divided calcium hydroxide or oxide and finely-divided calcium salt(s) may be stirred into a solution of borax and alkali-metal hydroxide.

The calcium oxide or hydroxide used should be as freshly calcined or slaked (respectively) as possible, i.e. should have as low a carbonate content as possible. Also both the calcium oxide or hydroxide and the calcium sulphate and/or other calcium salt(s) used should be as finely divided as possible (suitably 80–90% of the material passes a 200-mesh British Standard sieve).

When calcium sulphate is used as the (or a) calcium salt, it is preferred that it should be in the form of gypsum. It is of course to be understood that the calcium salts used in the present method as reactants are calcium salts other than calcium metaborate.

As already indicated, sodium sulphate and/or one or more other alkali-metal salts are formed in the method of the present invention together with the hydrated calcium metaborate. Normally, however, it is convenient that the separation of the alkal-metal salt(s) on the one hand and the calcium metaborate on the other hand should be consecutive and not concurrent, i.e. it is normally preferable that the hydrated calcium metaborate should be allowed to crystallise out of solution first and that the alkali-metal salt(s) should be removed from solution subsequently. Usually the separation of the sodium sulphate and/or other alkali-metal salt(s) may be effected by an appropriate change in temperature (normally a reduction, but in the case of sodium sulphate itself either a reduction or increase, sodium sulphate having a maximum solubility at about 33° C.). However, principles and methods of desulphation by removal of sodium sulphate either as the anhydrous salt or as the decahydrate, according to temperature, are already well known.

The invention is illustrated by the following examples.

*Example I*

150 grams of borax ($Na_2B_4O_7 \cdot 10H_2O$) and 32 grams of sodium hydroxide were dissolved in 900 ccs. of water at a temperature of 55° C. and added to a slurry comprising 7.25 grams of finely-divided calcium hydroxide, 16.75 grams of finely-divided calcium sulphate dihydrate and 100 ccs. of water. The mixture was stirred and 0.5 gram of calcium metaborate tetrahydrate added as "seed." The mixture was then maintained at a temperature of 50° C. for 15 hours, being stirred slowly throughout. At the end of this time all the original calcium hydroxide and calcium sulphate had reacted and crystalline calcium metaborate tetrahydrate remained. The product was removed by filtration from the liquors, which contained sodium borate and sodium sulphate. When chemically pure starting materials were used the reaction was quantitative.

*Example II*

450 grams of borax and 96 grams of sodium hydroxide were dissolved in 900 ccs. of water, and this solution at a temperature of 55° C. was added to a slurry containing 22 grams of calcium hydroxide and 50 grams of calcium sulphate dihydrate in 100 ccs. of water, to which 0.5 gram of finely ground calcium metaborate tetrahydrate "seed" had been added. The mixture was stirred slowly for 5 hours at 50° C., when the insoluble product was separated and found to be essentially crystalline calcium metaborate tetrahydrate.

*Example III*

In a further experiment it was found that if a solution of the composition given in Example I was added at a temperature of 55° C. to a slurry as in Example I which was on this occasion at 18° C. and the mixture stirred for five minutes, needle-like crystals (up to 0.5 cm. in length) of pure crystalline calcium metaborate tetrahydrate formed after 3 days.

*Example IV*

A slurry of the composition of Example I was mixed with 0.5 of finely-divided calcium metaborate hexahydrate at 18° C., and a solution of the composition of Example I at 18° C. was added to it. The mixture was stirred slowly for 5 hours, after which time the insoluble product was found to be essentially crystalline calcium metaborate hexahydrate.

*Example V*

A solution of 150 grams of borax, 32 grams of sodium hydroxide, 220 grams of anhydrous sodium sulphate in 900 ccs. of water at 55° C. was added to a slurry of 7.25 grams of calcium hydroxide, 16.75 grams of calcium sulphate dihydrate and 0.5 gram of calcium metaborate tetrahydrate "seed" at 18° C. The temperature was increased to and maintained at 50° C. for 5 hours, after which the insoluble product was separated and found to be essentially crystalline calcium metaborate tetrahydrate.

Sodium sulphate was crystallised from the mother liquor by reducing the temperature to about 20° C.

*Example VI*

A solution of the composition given in Example I was added at 55° C. to a slurry containing 7.25 grams of calcium hydroxide, 21.3 grams of calcium chloride hexahydrate and 0.5 gram of calcium metaborate tetrahydrate "seed" in 100 ccs. of water at 18° C. The mixture was raised to 50° C. and this temperature was maintained for 5 hours with continuous slow stirring. An insoluble product which separated was essentially crystalline calcium metaborate tetrahydrate.

In any of the above examples, the calcium hydroxide and calcium salt may be added in the form of dry fine powders, the volume of the water used for the solution of sodium hydroxide and borax being increased from 900 to 1000 ccs. to make up for the 100 ccs. used in the slurries of calcium hydroxide and calcium salt in Examples I–VI. The products obtained are similar in amount and nature to those obtained in Examples I–VI themselves.

We claim:

1. The cyclic method of producing hydrated crystalline calcium metaborate which comprises making an aqueous solution of sodium 1:2-borate and an alkali metal hydroxide, adding to said solution calcium sulfate and a material selected from the group consisting of calcium oxide and calcium hydroxide, removing hydrated crystalline calcium metaborate and sodium sulfate from the reaction mass, adding sodium 1:2-borate to the resultant liquor and repeating the cycle said calcium sulfate and material selected from the group consisting of the oxide and hydroxide of calcium added in a molar ratio of from about 1:0.95 to about 1:1.05 respectively.

2. The cyclic method of producing calcium metaborate tetrahydrate which comprises making an aqueous solution of sodium 1:2-borate and an alkali metal hydroxide, adding to said solution calcium sulfate and a material selected from the group consisting of the oxide and hydroxide of calcium in a molar ratio of from about 1:0.95 to about 1:1.05, respectively, heating the reaction mass to a temperature of from about 40° to about 100° C., seeding the heated reaction mass with calcium metaborate tetrahydrate, separating calcium metaborate tetrahydrate and sodium sulfate from the reaction mass, adding sodium 1:2-borate to the resultant liquor and repeating the cycle.

References Cited in the file of this patent

UNITED STATES PATENTS 2,717,240    Fronmuller _____ Sept. 6, 1955

FOREIGN PATENTS 352,137    Great Britain _____ July 9, 1931

OTHER REFERENCES

Mellor: "A Comprehensive Treatise on Inorganic and Theoretical Chem.," vol. V, 1924, pp. 87 and 88.

Mellor: "A Comprehensive Treatise on Inorganic and Theoretical Chemistry," vol. V (1924), page 67, Longmans, Green & Co.